United States Patent
White et al.

(10) Patent No.: US 9,481,350 B2
(45) Date of Patent: Nov. 1, 2016

(54) ECP/TRIPLE VALVE TRANSITION PLATE

(71) Applicant: Wabtec Holding Corp., Wilmerding, PA (US)

(72) Inventors: Warren White, Sydney (AU); Edward W. Gaughan, Greensburg, PA (US); William John Potter, Trafford, PA (US); Gary M. Sich, Irwin, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 13/965,608

(22) Filed: Aug. 13, 2013

(65) Prior Publication Data

US 2014/0049037 A1    Feb. 20, 2014

Related U.S. Application Data

(60) Provisional application No. 61/682,548, filed on Aug. 13, 2012.

(51) Int. Cl.
*B60T 13/66* (2006.01)
*B60T 17/04* (2006.01)

(52) U.S. Cl.
CPC ............ *B60T 17/043* (2013.01); *B60T 13/665* (2013.01); *B60T 17/04* (2013.01); *Y10T 29/49826* (2015.01)

(58) Field of Classification Search
CPC .... B60T 17/043; B60T 17/04; B60T 13/665; B60T 13/365; B60T 13/405; B60T 13/465; Y10T 29/49826
USPC .......................................... 303/1, 7, 28, 128
See application file for complete search history.

(56) References Cited

U.S. PATENT DOCUMENTS

| | | | | | |
|---|---|---|---|---|---|
| 5,106,169 | A | * | 4/1992 | Barefoot | 303/22.7 |
| 5,451,099 | A | * | 9/1995 | Hart et al. | 303/33 |
| 5,480,218 | A | * | 1/1996 | Hart et al. | 303/28 |
| 5,503,011 | A | * | 4/1996 | Hart et al. | 73/121 |
| 5,634,696 | A | * | 6/1997 | Hart et al. | 303/28 |
| 5,695,258 | A | * | 12/1997 | Reid et al. | 303/3 |
| 6,035,250 | A | * | 3/2000 | Newton et al. | 701/70 |
| 6,227,625 | B1 | | 5/2001 | Gaughan | |
| 6,318,812 | B1 | * | 11/2001 | Newton et al. | 303/82 |
| 6,416,034 | B1 | | 7/2002 | Sich | |
| 6,422,531 | B1 | | 7/2002 | Sich | |
| 6,472,769 | B1 | * | 10/2002 | Long et al. | 307/9.1 |

(Continued)

OTHER PUBLICATIONS

ROA Manual, Section 7, "Freight Vehicle Brakes and Brake Equipment", Adopted Oct. 24, 1991.*

*Primary Examiner* — Thomas Irvin
(74) *Attorney, Agent, or Firm* — The Webb Law Firm (57) ABSTRACT

A transition plate connects an electronic manifold to a pipe mounting bracket of a railway brake system and includes a body having a manifold portion that defines a face configured to engage the manifold and a pipe bracket portion that defines a face configured to engage the pipe mounting bracket; ports defined in the manifold face that are configured to align and communicate with ports in the face of the manifold; ports defined in the pipe bracket face that are configured to align and communicate with ports in the face of the pipe mounting bracket; and a plurality of air passages extending through the body for connecting the plurality of ports defined in the manifold face with the plurality of ports defined in the pipe bracket face. The transition plate establishes a pneumatic interface between the electronic manifold and the pipe mounting bracket.

13 Claims, 9 Drawing Sheets

(56) References Cited

U.S. PATENT DOCUMENTS

| | | |
|---|---|---|
| 6,839,664 B1 * | 1/2005 | Kull ............................ 703/23 |
| 6,971,723 B2 | 12/2005 | Engle et al. |
| 7,144,090 B2 * | 12/2006 | Kull et al. .................. 303/118.1 |
| 7,357,463 B2 | 4/2008 | Barberis et al. |
| 8,049,608 B2 | 11/2011 | Gaughan |
| 2005/0099061 A1 * | 5/2005 | Hollandsworth et al. ........ 303/7 |
| 2010/0256842 A1 * | 10/2010 | Liberatore ...................... 701/19 |
| 2013/0248031 A1 * | 9/2013 | Sich et al. ............... 137/624.27 |

* cited by examiner

ECP/TRIPLE VALVE TRANSITION PLATE

CROSS REFERENCE TO RELATED APPLICATION

The present application claims priority from U.S. Provisional Patent Application No. 61/682,548, filed on Aug. 13, 2012, which is incorporated herein by reference in its entirety.

BACKGROUND OF THE INVENTION

1. Field of the Invention

The present invention relates to a brake apparatus for railway vehicles and, more particularly, to a transition plate to accommodate the application of a stand-alone ECP All Electric Manifold (AEM) to an existing Triple Valve brake system.

2. Description of Related Art

Railways of Australia has a standardized pneumatic air brake valve control system, known as a Triple Valve system, which is similar in overall operation to American Association of Railroads (AAR) pneumatic air brake valves (such as the WABCO ABDX), with a pipe bracket, a control valve unit, and a combined reservoir.

Triple Valve equipment does not currently support Electronically Controlled Pneumatic (ECP) functionality and must, instead, be pneumatically controlled. However, ECP braking systems are gaining popularity in the rest of the world and offer many advantages over pneumatic equipment. It is highly desirable to have the ability to apply ECP equipment to railcars to take advantage of the superior braking and safety capabilities offered by ECP equipment.

The ECP brake equipment on each rail vehicle may include a stand-alone All Electric Manifold (AEM), which contains the pressure transducers, various pneumatic and electro-pneumatic valves, etc. This equipment is used to monitor the pressures in the brake pipe, the brake cylinder(s), and specific reservoirs, and to convert the electrical brake commands into a form usable by a microprocessor. Operating according to its programming code and to the dictates of the brake commands and other electrical signals it has received, the microprocessor controls the aforementioned electro-pneumatic valves in a manner well known in the brake control art.

However, AEM units having ECP functionality are not compatible and cannot directly interface with existing Triple Valve equipment due to the slight differences in construction and functionality between the current ECP and Triple Valve systems.

SUMMARY OF THE INVENTION

Accordingly, there is a general need in the art for a retrofit that allows for the use of an AEM with ECP functionality on existing Triple Valve equipment in order to achieve the benefits of ECP functionality without the necessity of reconstructing existing systems.

According to one embodiment, a transition plate provides the appropriate air-connections between an existing Triple Valve equipped railcar and an ECP stand-alone AEM. The transition plate provides an efficient application, with minimal configuration change, of an AEM to existing Triple Valve brake equipment.

According to one embodiment, the transition plate allows for an AAR compliant ECP stand-alone AEM to be mounted to an existing Triple Valve system to obtain full ECP S-4200 functionality in the Triple Valve system without any additional reconfiguration of the Triple Valve system. Also, system parameters for the ECP application in a Triple Valve brake system are defined using the Triple Valve brake equipment specification provided in the ROA Manual, Section 7-Freight Vehicle Brakes and Brake Equipment.

According to one particular embodiment of the invention, a transition plate for connecting an electronic manifold to a pipe mounting bracket of a railway brake system is provided. The transition plate includes a body having a manifold portion that defines a manifold face configured to engage a face of the electronic manifold and a pipe bracket portion that defines a pipe bracket face configured to engage a face of the pipe mounting bracket; a plurality of ports defined in the manifold face that are configured to align and communicate with ports in the face of the electronic manifold; a plurality of ports defined in the pipe bracket face that are configured to align and communicate with ports in the face of the pipe mounting bracket; and a plurality of air passages extending through the body of the transition plate for connecting the plurality of ports defined in the manifold face with the plurality of ports defined in the pipe bracket face. The transition plate establishes a pneumatic interface between the electronic manifold and the pipe mounting bracket.

According to a particular embodiment, the body may further include a plurality of reliefs defined therein for accepting fasteners for connecting the transition plate to the electronic manifold and to the pipe mounting bracket. The plurality of ports in the manifold face may include an emergency reservoir port, an auxiliary reservoir port, a brake pipe port, and a brake cylinder port. The plurality of ports in the pipe bracket face may include an accelerated release or control reservoir port, an auxiliary reservoir charging port, a brake pipe port, and a brake cylinder or dummy volume port. The electronic manifold may be an All Electric Manifold or an overlay manifold that is configured to include an electronic capability and a pneumatic Triple Valve capability so as to enable pneumatic and ECP functionality. The railway brake system may be a Triple Valve brake system.

According to another aspect of a particular embodiment, the plurality of ports in the manifold face include an emergency reservoir port, an auxiliary reservoir port, a brake pipe port, and a brake cylinder port. The plurality of ports in the pipe bracket face include an accelerated release or control reservoir port, an auxiliary reservoir charging port, a brake pipe port, and a brake cylinder or dummy volume port. The emergency reservoir port in the manifold face is in communication with the accelerated release or control reservoir port in the pipe bracket face, the auxiliary reservoir port in the manifold face is in communication with the auxiliary reservoir charging port in the pipe bracket face, the brake pipe port in the manifold face is in communication with the brake pipe port in the pipe bracket face, and the brake cylinder port in the manifold face is in communication with the brake cylinder or dummy volume port in the pipe bracket face.

Also, the manifold face may include a plurality of mounting holes which are configured to accept fasteners to connect the manifold portion to the face of the electronic manifold, and the pipe bracket face includes a plurality of mounting holes which are configured to accept fasteners to connect the pipe bracket portion to the face of the pipe mounting bracket.

According to another particular embodiment of the invention, a railway brake system is provided. The system includes a pipe mounting bracket having a face with a plurality of ports defined therein for establishing pneumatic connections within the system; an electronic manifold having a face with a plurality of ports defined therein for establishing pneumatic connections within the system; and a transition plate for pneumatically connecting the electronic manifold to the pipe mounting bracket. The transition plate includes a body having a manifold portion that defines a manifold face engaging the face of the electronic manifold and a pipe bracket portion that defines a pipe bracket face engaging the face of the pipe mounting bracket; a plurality of ports defined in the manifold face that are configured to align and communicate with the ports in the face of the electronic manifold; a plurality of ports defined in the pipe bracket face that are configured to align and communicate with the ports in the face of the pipe mounting bracket; and a plurality of air passages extending through the body of the transition plate for connecting the plurality of ports defined in the manifold face with the plurality of ports defined in the pipe bracket face. The transition plate establishes a pneumatic interface between the electronic manifold and the pipe mounting bracket.

According to a particular embodiment, the body of the transition plate may further include a plurality of reliefs defined therein for accepting fasteners for connecting the transition plate to the electronic manifold and to the pipe mounting bracket. The plurality of ports in the manifold face of the transition plate may include an emergency reservoir port, an auxiliary reservoir port, a brake pipe port, and a brake cylinder port. The plurality of ports in the pipe bracket face of the transition plate may include an accelerated release or control reservoir port, an auxiliary reservoir charging port, a brake pipe port, and a brake cylinder or dummy volume port. The electronic manifold may be an All Electric Manifold or an overlay manifold that is configured to include an electronic capability and a pneumatic Triple Valve capability so as to enable pneumatic and ECP functionality. The railway brake system may be a Triple Valve brake system.

According to another aspect of a particular embodiment, the plurality of ports in the manifold face of the transition plate includes an emergency reservoir port, an auxiliary reservoir port, a brake pipe port, and a brake cylinder port. The plurality of ports in the pipe bracket face of the transition plate includes an accelerated release or control reservoir port, an auxiliary reservoir charging port, a brake pipe port, and a brake cylinder or dummy volume port. The emergency reservoir port in the manifold face is in communication with the accelerated release or control reservoir port in the pipe bracket face. The auxiliary reservoir port in the manifold face is in communication with the auxiliary reservoir charging port in the pipe bracket face. The brake pipe port in the manifold face is in communication with the brake pipe port in the pipe bracket face. The brake cylinder port in the manifold face is in communication with the brake cylinder or dummy volume port in the pipe bracket face. The plurality of ports defined in the face of the pipe mounting bracket includes an accelerated release or control reservoir port, an auxiliary reservoir charging port, and a brake cylinder or dummy volume port. The plurality of ports defined in the face of the electronic manifold includes an emergency reservoir port, an auxiliary reservoir port, a brake pipe port, and a brake cylinder port. The transition plate pneumatically connects the emergency reservoir port in the face of the electronic manifold with the accelerated release or control reservoir port in the face of the pipe mounting bracket via the emergency reservoir port in the manifold face and the accelerated release or control reservoir port in the pipe bracket face, the auxiliary reservoir port in the face of the electronic manifold with the auxiliary reservoir charging port in the face of the pipe mounting bracket via the auxiliary reservoir port in the manifold face and the auxiliary reservoir charging port in the pipe bracket face, the brake pipe port in the face of the electronic manifold with the brake pipe port in the face of the pipe mounting bracket via the brake pipe port in the manifold face and the brake pipe port in the pipe bracket face, and the brake cylinder port in the face of the electronic manifold with the brake cylinder or dummy volume port in the face of the pipe mounting bracket via the brake cylinder port in the manifold face and the brake cylinder or dummy volume port in the pipe bracket face.

According to yet another particular embodiment of the invention, a method of pneumatically connecting an electronic manifold to a pipe mounting bracket of a railway brake system is provided. The electronic manifold includes a face with a plurality of ports defined therein and the pipe mounting bracket includes a face with a plurality of ports defined therein. The method includes the steps of providing a transition plate, the transition plate comprising a body having a manifold portion that defines a manifold face and a pipe bracket portion that defines a pipe bracket face; a plurality of ports defined in the manifold face and a plurality of ports defined in the pipe bracket face; and a plurality of air passages extending through the body of the transition plate for connecting the plurality of ports defined in the manifold face with the plurality of ports defined in the pipe bracket face. The method further comprises the steps of engaging the face of the electronic manifold with the manifold face of the transition plate, and aligning and communicating the plurality of ports in the manifold face with the plurality of ports in the face of the electronic manifold; engaging the face of the pipe mounting bracket with the pipe bracket face of the transition plate, and aligning and communicating the plurality of ports in the pipe bracket face with the plurality of ports in the face of the pipe mounting bracket; and establishing a pneumatic interface between the electronic manifold and the pipe mounting bracket via the transition plate.

According to a particular embodiment, the plurality of ports in the manifold face of the transition plate include an emergency reservoir port, an auxiliary reservoir port, a brake pipe port, and a brake cylinder port. The plurality of ports in the pipe bracket face of the transition plate include an accelerated release or control reservoir port, an auxiliary reservoir charging port, a brake pipe port, and a brake cylinder or dummy volume port. The emergency reservoir port in the manifold face is in communication with the accelerated release or control reservoir port in the pipe bracket face, and the auxiliary reservoir port in the manifold face is in communication with the auxiliary reservoir charging port in the pipe bracket face. The brake pipe port in the manifold face is in communication with the brake pipe port in the pipe bracket face, and the brake cylinder port in the manifold face is in communication with the brake cylinder or dummy volume port in the pipe bracket face. The plurality of ports defined in the face of the pipe mounting bracket include an accelerated release or control reservoir port, an auxiliary reservoir charging port, a brake pipe port, and a brake cylinder or dummy volume port. The plurality of ports defined in the face of the electronic manifold include an emergency reservoir port, an auxiliary reservoir port, a brake pipe port, and a brake cylinder port. The step of establishing a pneumatic interface between the electronic manifold and the pipe mounting bracket includes pneumatically connecting the emergency reservoir port in the face of the electronic manifold with the accelerated release or control reservoir port in the face of the pipe mounting bracket via the emergency reservoir port in the manifold face and the accelerated release or control reservoir port in the pipe bracket face, the auxiliary reservoir port in the face of the electronic manifold with the auxiliary reservoir charging port in the face of the pipe mounting bracket via the auxiliary reservoir port in the manifold face and the auxiliary reservoir charging port in the pipe bracket face, the brake pipe port in the face of the electronic manifold with the brake pipe port in the face of the pipe mounting bracket via the brake pipe port in the manifold face and the brake pipe port in the pipe bracket face, and the brake cylinder port in the face of the electronic manifold with the brake cylinder or dummy volume port in the face of the pipe mounting bracket via the brake cylinder port in the manifold face and the brake cylinder or dummy volume port in the pipe bracket face.

Further details and advantages of the various embodiments of the invention detailed herein will become clear upon reviewing the following detailed description of the preferred embodiments in conjunction with the accompanying drawing figures.

DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
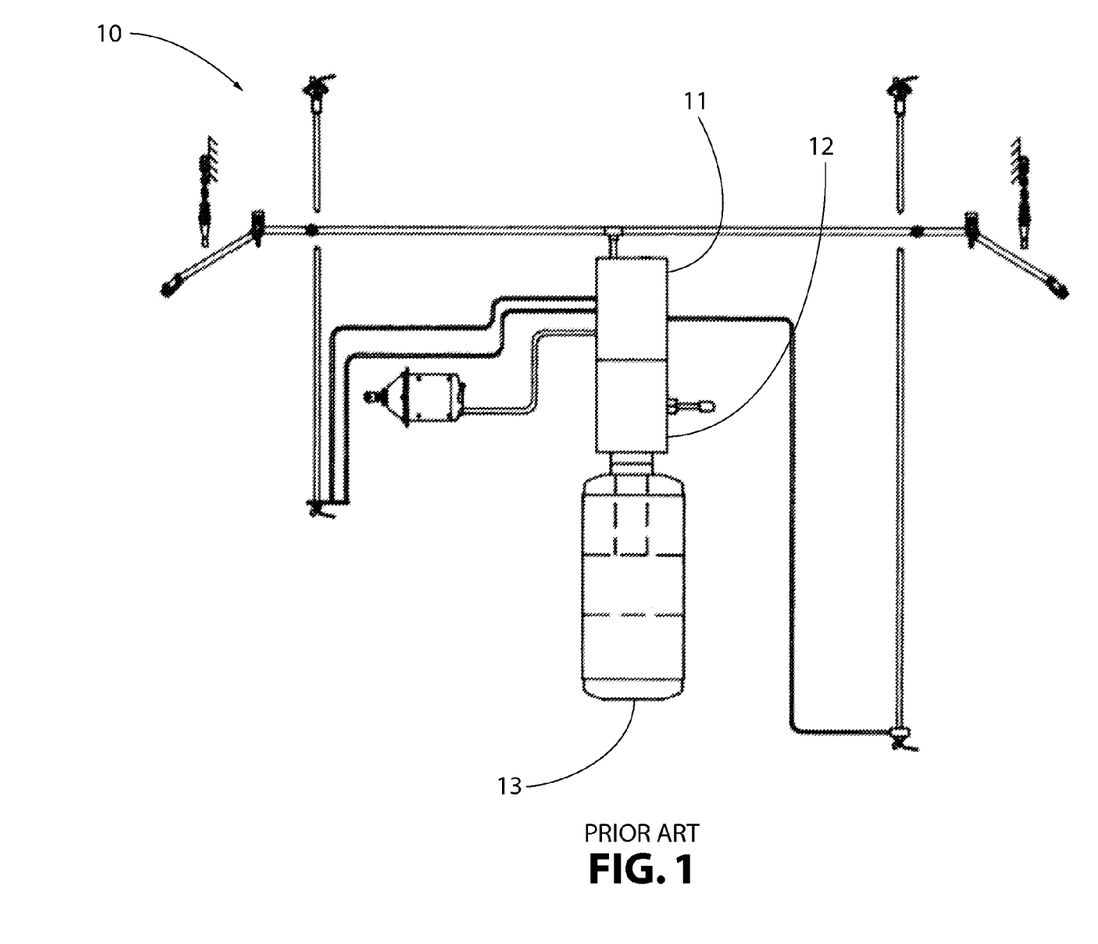
FIG. 1 is a schematic of a prior art Triple Valve brake control system for a freight car.

FIG. 1 illustrates a typical prior art brake system 10 for a single railway freight car according to the Triple Valve brake equipment specification in accordance with the ROA Manual, Section 7-Freight Vehicle Brakes and Brake Equipment. The brake system 10 includes a pipe mounting bracket 11 having various pipes attached thereto for establishing a pneumatic connection between the various components of the system to a control valve unit 12 interfacing with the pipe mounting bracket 11. The control valve unit 12 is in communication with a combined reservoir 13 that contains a supply of pressurized air. The flow of the pressurized air between various locations within the brake system 10 is controlled by the control valve unit 12 to perform various brake valve functions.

Figure 2:
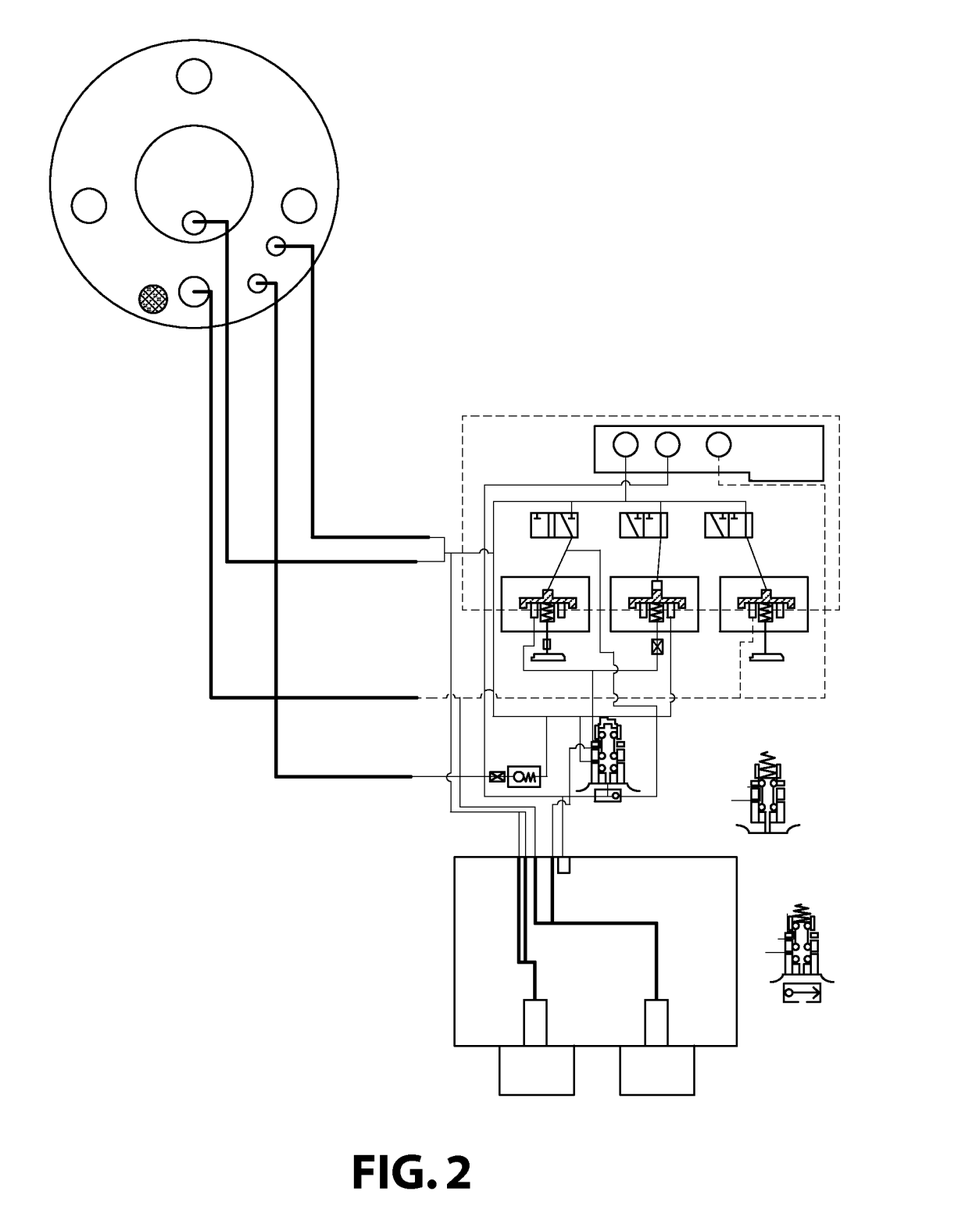
FIG. 2 is a schematic of the necessary port connections to be made between an ECP stand-alone AEM and a Triple Valve brake control system via a Triple Valve pipe mounting bracket.

In a typical Triple Valve system, the cars are operated as a Tandem-Pair, with each car being approximately 17 meters in length. The brake system arrangement is a relayed system, i.e., one control portion pressure output is relayed from the reservoir 13 to the brake cylinders on each car. As shown in FIG. 2, the AEM will control the development of brake cylinder pressure in a 'dummy-volume' and this pressure output will be relayed from the reservoir 13 to the brake cylinders. In order to emulate the North American Auxiliary/Emergency Reservoirs, the Triple Valve Accelerated Release and Auxiliary Reservoirs are combined via a transition plate 50 shown in FIG. 5.

Figure 3:
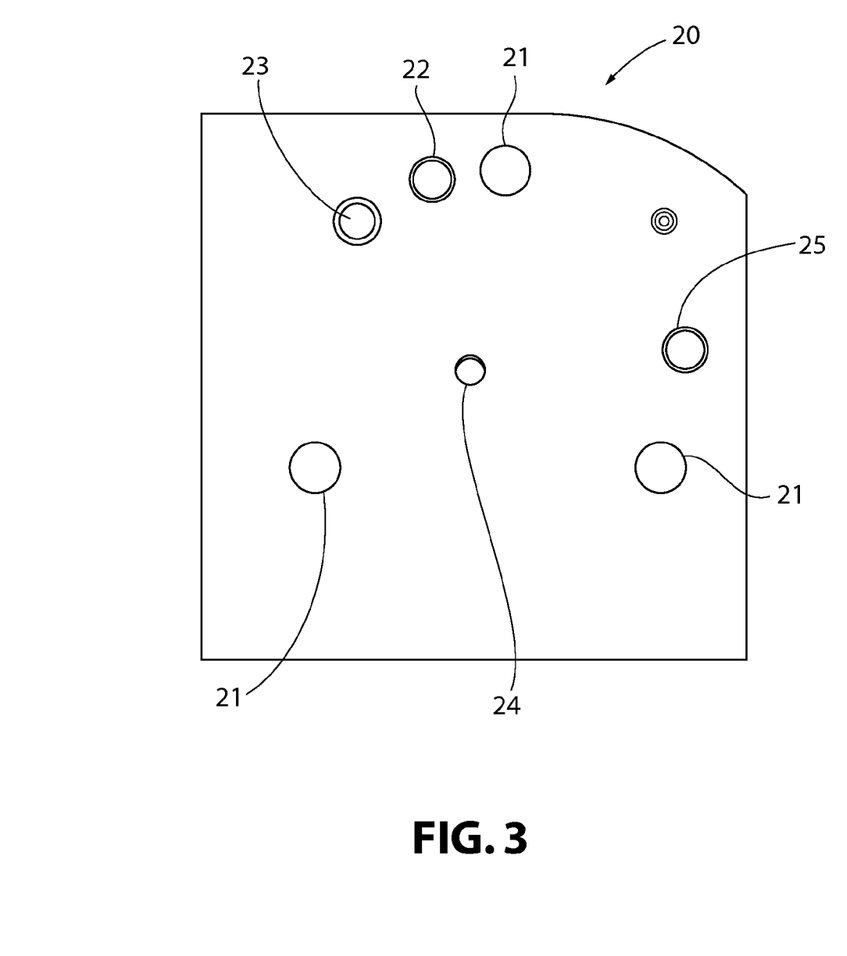
FIG. 3 is a schematic of an AEM pipe bracket face.
Figure 4:
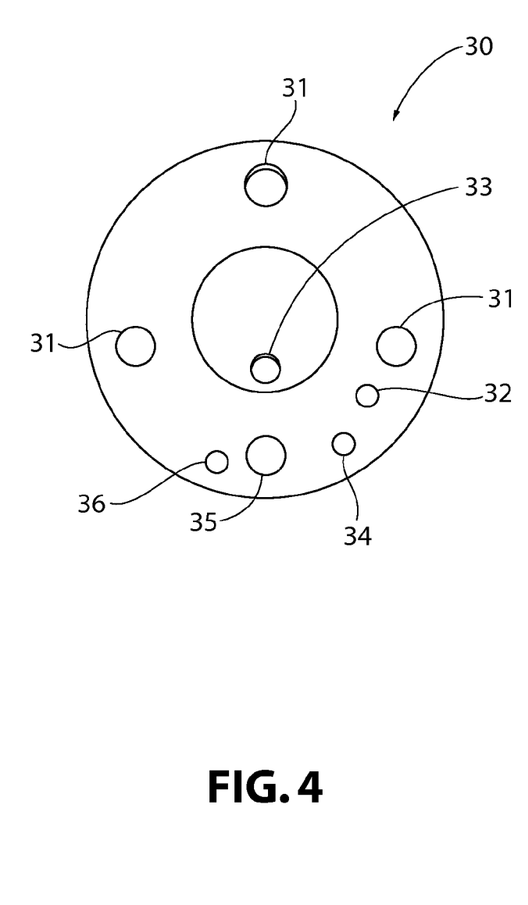
FIG. 4 is a schematic of a Triple Valve pipe mounting bracket face.
Figure 10:
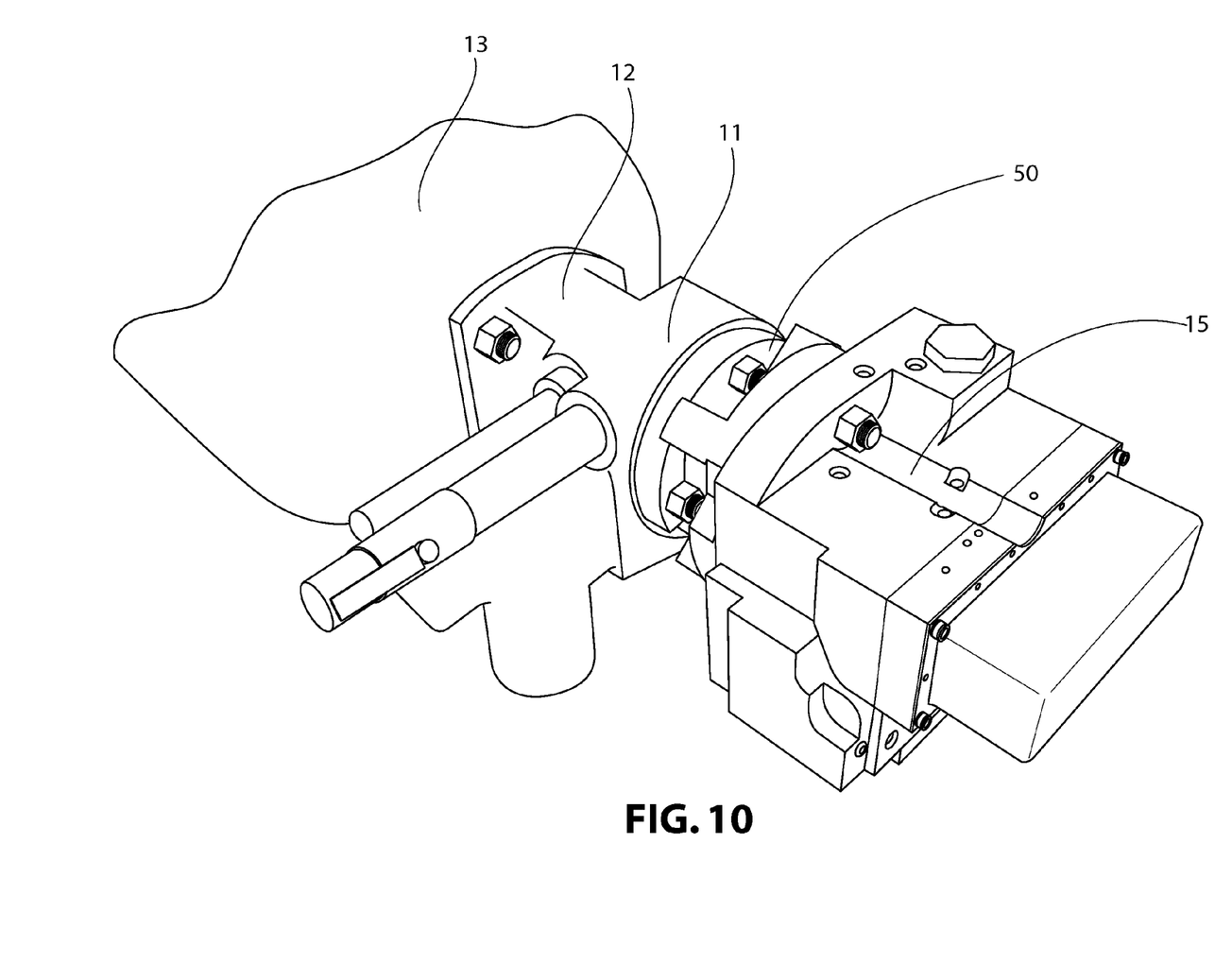
FIG. 10 is a perspective view of a Triple Valve system interfacing with the stand-alone AEM via the transition plate of FIG. 5.

With reference to FIGS. 3 and 4, in order to establish ECP functionality in the Triple Valve system, a stand-alone AEM 15, shown in FIG. 10, having a pipe bracket face 20 must be connected to a pipe bracket face 30 on the pipe mounting bracket 11 of the Triple Valve brake system 10 in a manner that establishes the proper pneumatic connections between the AEM 15 and the control valve unit 12. In particular, an emergency reservoir port 22 of the AEM pipe bracket face 20 must be connected with an accelerated release or control reservoir port 32 on the Triple Valve pipe bracket face 30; an auxiliary reservoir port 23 of the AEM pipe bracket face 20 must be connected with an auxiliary reservoir charging port 33 of the Triple Valve pipe bracket face 30; a brake pipe port 24 of the AEM pipe bracket face 20 must be connected with a brake pipe port 34 of the Triple Valve pipe bracket face 30; and a brake cylinder port 25 of the AEM pipe bracket face 20 must be connected with a brake cylinder or dummy volume port 35 of the Triple Valve pipe bracket face 30. The AEM pipe bracket face 20 also includes a plurality of mounting holes 21 for attaching the AEM 15 to a pipe mounting bracket. Likewise, the Triple Valve pipe bracket face 30 also includes a plurality of mounting holes 31 such that a pneumatic manifold may be attached thereto. The Triple Valve pipe bracket face 30 further includes an exhaust port 36, which must be blanked-off when the AEM 15 is connected to the Triple Valve pipe mounting bracket 11.

As can be appreciated from FIGS. 3 and 4, the AEM 15 and the Triple Valve pipe mounting bracket 11 use different porting interfaces in accordance with separate national standards and are not structurally compatible. The transition plate 50, shown in FIGS. 5-10, acts as a retrofit for modifying existing Triple Valve brake systems 10, such as shown in FIG. 1, to be compatible with an AEM 15 in order to achieve ECP functionality.

Figure 7:
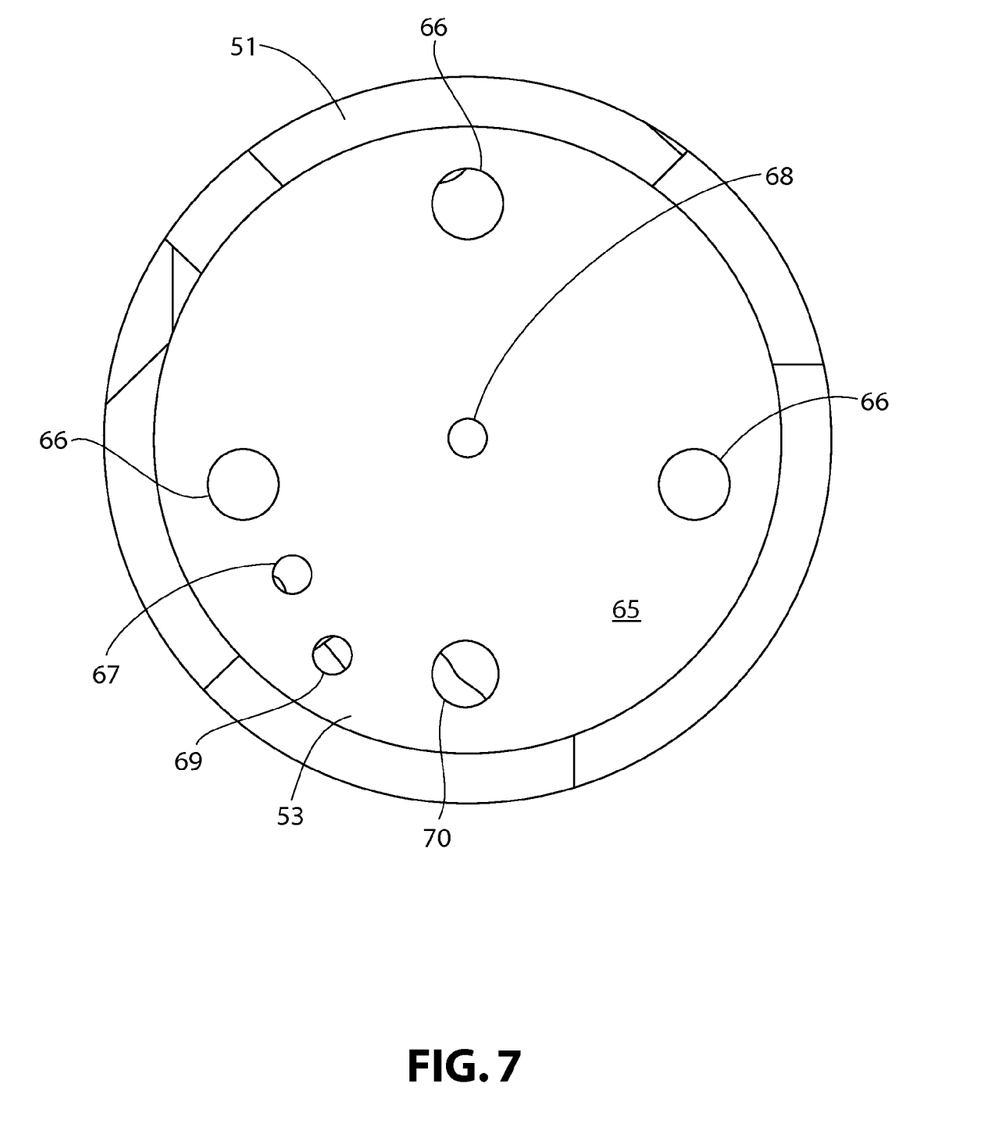
FIG. 7 is a view of a Triple Valve pipe mounting bracket engaging face of the transition plate of FIG. 5.
Figure 8:
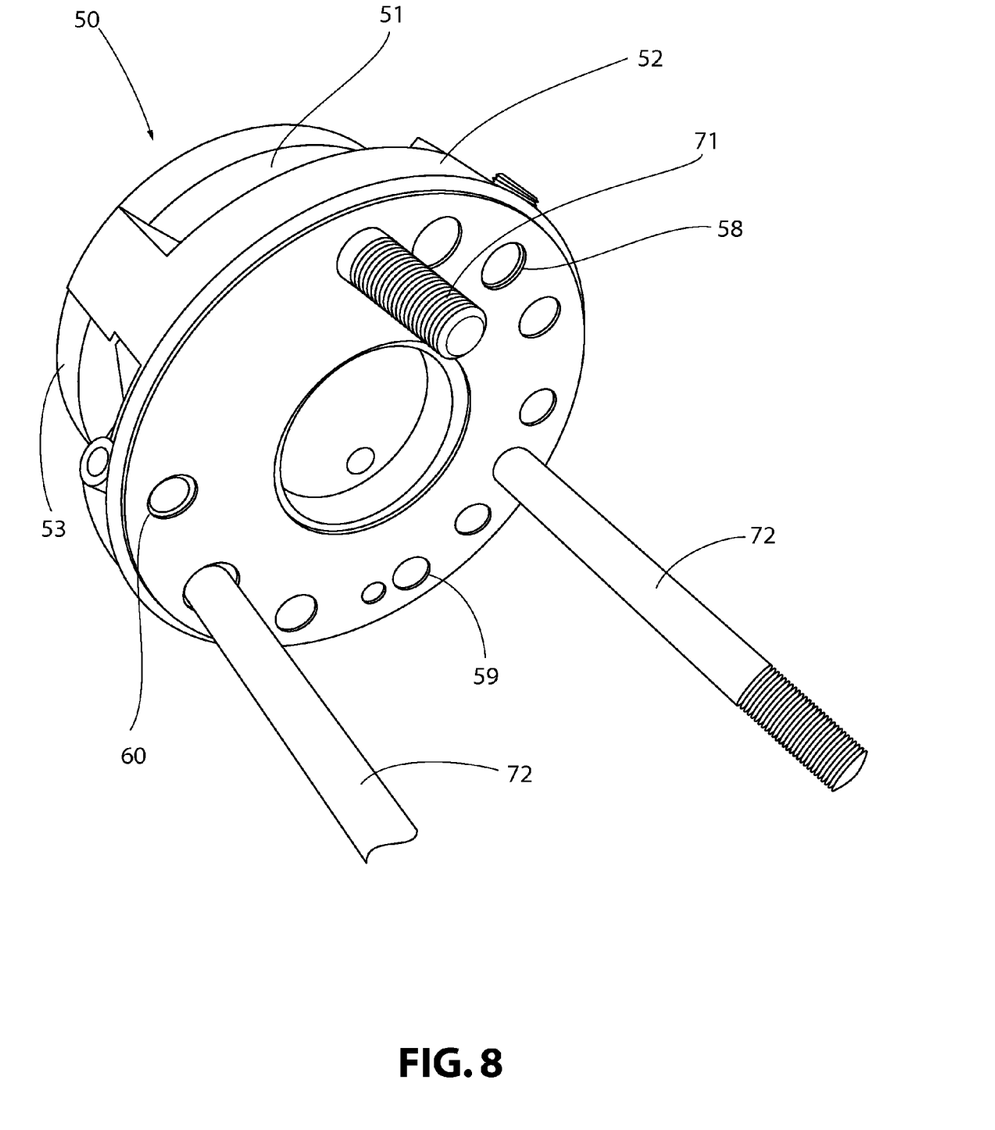
FIG. 8 is a perspective view of the transition plate of FIG. 5 provided with mounting studs.
Figure 9:
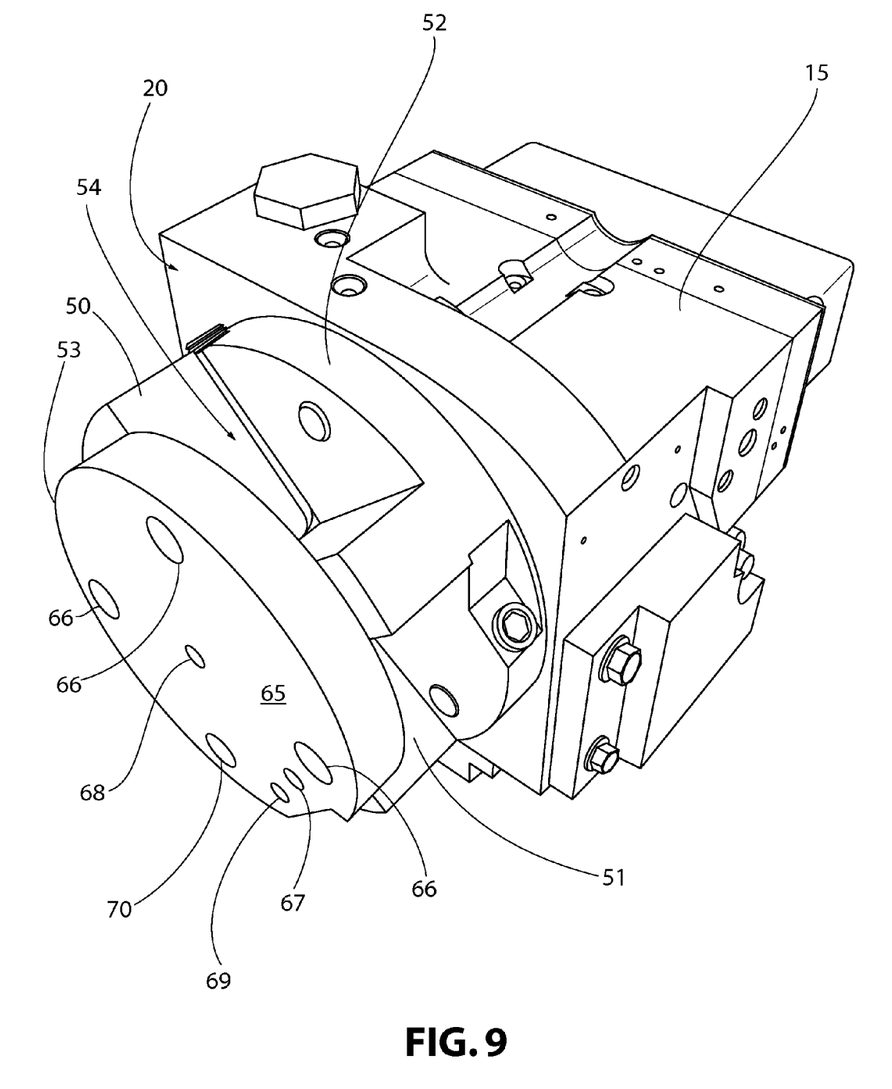
FIG. 9 is a perspective view of the transition plate of FIG. 5 connected to the stand-alone AEM.

With reference to FIGS. 5-10, the transition plate 50 includes a body 51 having a manifold portion 52, which defines a manifold face 55, and a pipe bracket portion 53, which defines a pipe bracket face 65. The manifold face 55 includes a plurality of mounting holes 56, which are provided with a mounting stud 71 and a pair of longer mounting studs 72, shown in FIG. 8, which are used to attach the transition plate 50 to the AEM pipe bracket face 20, as shown in FIG. 9. Similarly, the pipe bracket face 65 of the transition plate 50 includes a plurality of mounting holes 66, which are also provided with fasteners (not shown) that are used to attach the transition plate 50 to the Triple Valve pipe bracket face 30. The body 51 of the transition plate 50 includes a plurality of reliefs 54 in the circumference of the body 51 to provide access to apply the fasteners through the manifold portion 52 and the pipe bracket portion 53. Also, a central recessed area 61 may be provided in the manifold face 55 of the manifold portion 52 of the body 51.

Figure 5:
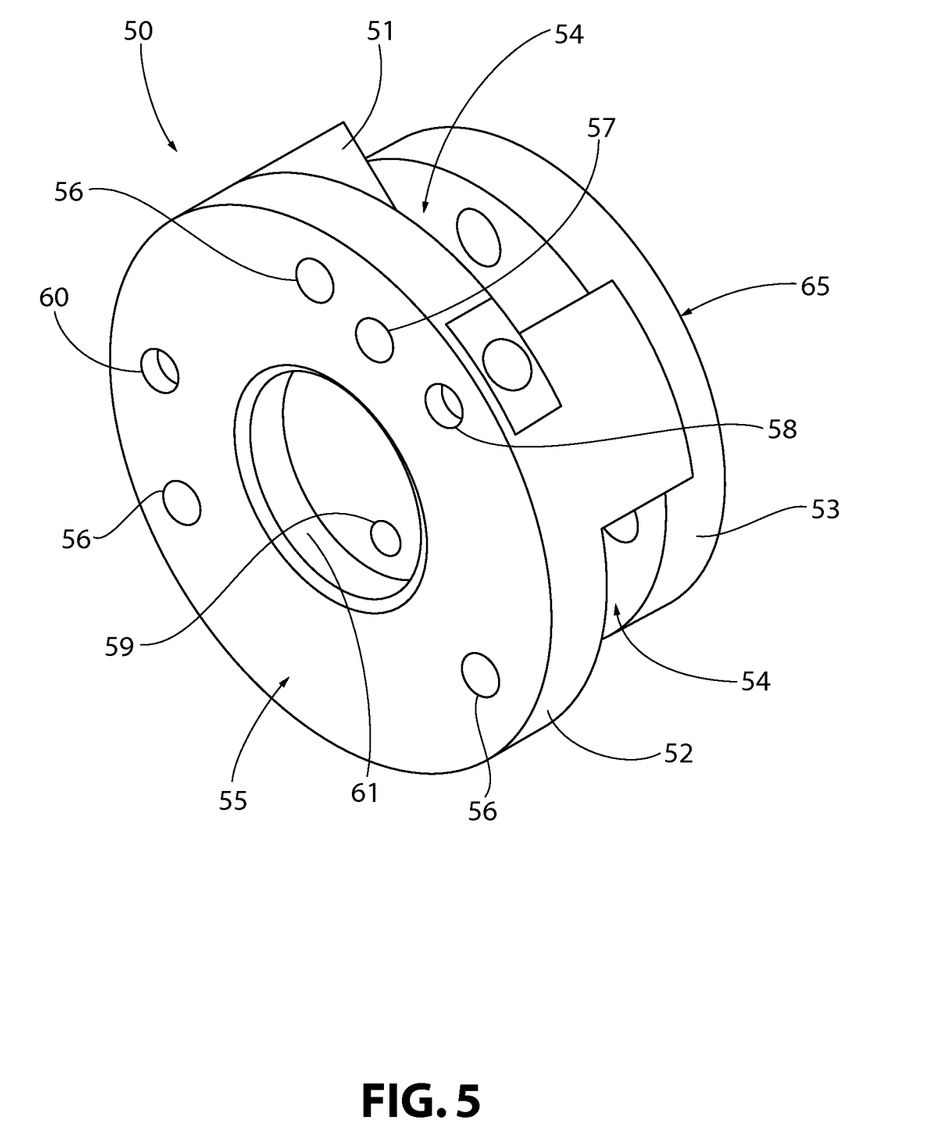
FIG. 5 is a perspective view of a transition plate for connecting the AEM pipe mounting bracket face to the Tripe Valve pipe bracket face according to an embodiment of the present invention.
Figure 6:
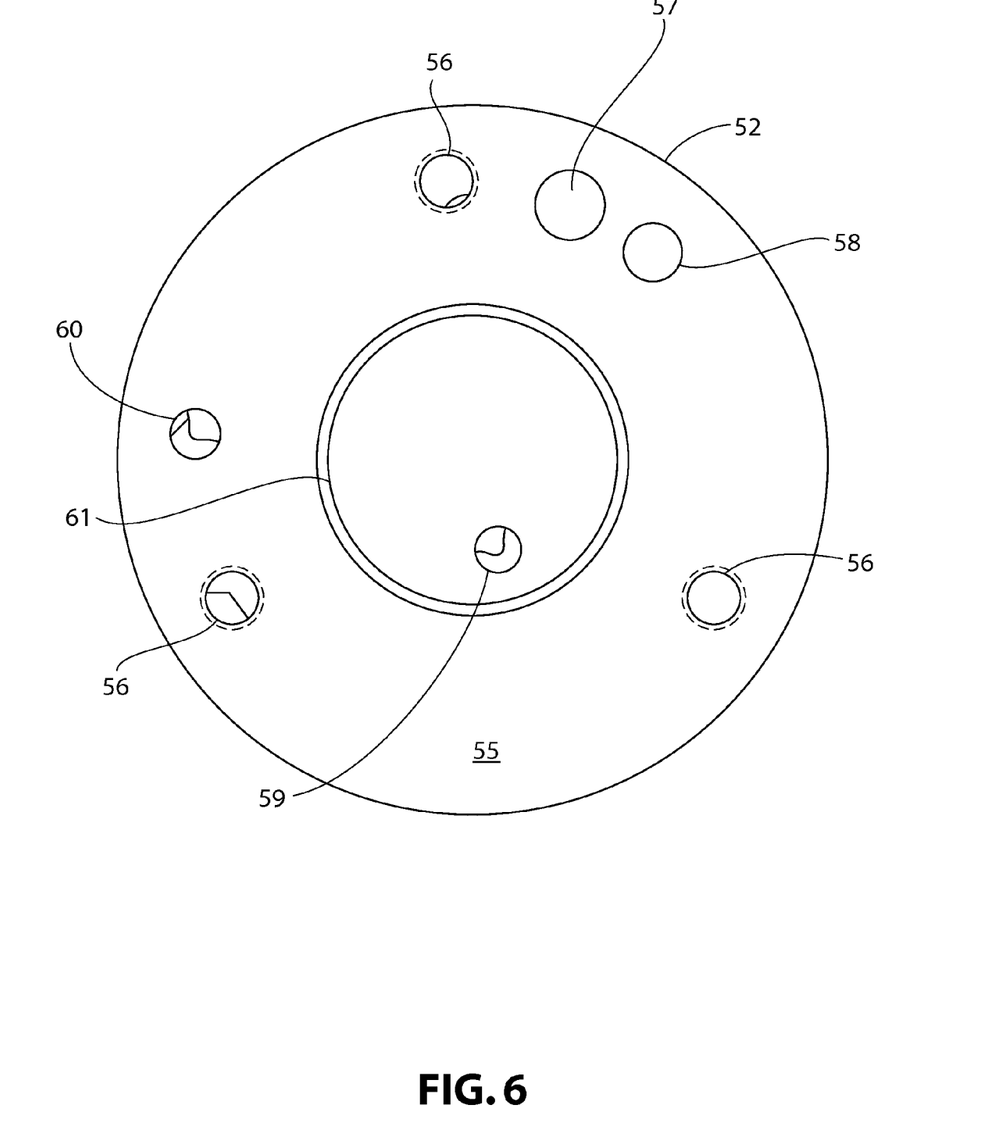
FIG. 6 is a view of an AEM engaging face of the transition plate of FIG. 5.

The manifold face 55 of the transition plate 50, shown in FIGS. 5 and 6, directly engages with the AEM pipe bracket face 20 (FIG. 3), as shown in FIGS. 9 and 10. The manifold face 55 of the transition plate 50 includes an emergency reservoir port 57 that aligns and communicates with the emergency reservoir port 22 of the AEM pipe bracket face 20; an auxiliary reservoir port 58 that aligns and communicates with the auxiliary reservoir port 23 of the AEM pipe bracket face 20; a brake pipe port 59 that aligns and communicates with the brake pipe port 24 of the AEM pipe bracket face 20; and a brake cylinder port 60 that aligns and communicates with the brake cylinder port 25 of the AEM pipe bracket face 20.

The pipe bracket face 65 of the transition plate 50, shown in FIG. 7, directly engages with the Triple Valve pipe bracket face 30, as shown in FIG. 10. The pipe bracket face 65 of the transition plate 50 includes an accelerated release or control reservoir port 67 that aligns and communicates with the accelerated release or control reservoir port 32 of the Triple Valve pipe bracket face 30; an auxiliary reservoir charging port 68 that aligns and communicates with the auxiliary reservoir charging port 33 of the Triple Valve pipe bracket face 30; a brake pipe port 69 that aligns and communicates with the brake pipe port 34 of the Triple Valve pipe bracket face 30; and a brake cylinder or dummy volume port 70 that aligns and communicates with the brake cylinder or dummy volume port 35 of the Triple Valve pipe bracket face 30.

The body 51 of the transition plate 50 includes a plurality of air passages (not shown) extending therethrough that communicate the emergency reservoir port 57 of the manifold face 55 with the accelerated release or control reservoir port 67 of the pipe bracket face 65, the auxiliary reservoir port 58 of the manifold face 55 with the auxiliary reservoir charging port 68 of the pipe bracket face 65, the brake pipe port 59 of the manifold face 55 with the brake pipe port 69 of the pipe bracket face 65, and the brake cylinder port 60 of the manifold face 55 with the brake cylinder or dummy volume port 70 of the pipe bracket face 65.

With reference to FIGS. 8-10, the transition plate 50 is connected to the AEM 15 by the studs 71, 72, which are suitable in size and length to support the thickness and weight of the AEM 15. Similar fasteners are used to connect the transition plate 50 and the AEM 15 to the pipe mounting bracket 11 of the brake system 10. The transition plate 50 is configured such that attachment of the transition plate 50 between the pipe mounting bracket 11 of the brake system 10 and the AEM 15 establishes a compatible interface between the AEM 15 and the brake system 10 to achieve ECP functionality by adapting the porting on the AEM 15 to the porting on the pipe mounting bracket 11 without requiring any additional modifications to the existing brake system. Accordingly, the corresponding ports of the AEM pipe bracket face 20 and the triple valve pipe bracket face 30 are placed in pneumatic communication via the ports and passages of the transition plate 50.

With reference to FIGS. 1-10, in accordance with another embodiment of the invention, a method of pneumatically connecting an electronic manifold, such as the AEM 15, to a pipe mounting bracket of a railway brake system, such as the pipe mounting bracket 11 of the Triple Valve brake system 10, is provided. As discussed above, the AEM 15 includes a pipe bracket face 20 having a plurality of ports 22, 23, 24, 25 defined therein and the pipe mounting bracket 11 includes a pipe bracket face 30 having a plurality of ports 32, 33, 34, 35 defined therein. The method includes the step of providing a transition plate 50 that includes a body 51 having a manifold portion 52 that defines a manifold face 55 and a pipe bracket portion 53 that defines a pipe bracket face 65; a plurality of ports 57, 58, 59, 60 defined in the manifold face 55 and a plurality of ports 67, 68, 69, 70 defined in the pipe bracket face 65; and a plurality of air passages extending through the body 51 for connecting the plurality of ports 57, 58, 59, 60 in the manifold face 55 with the plurality of ports 67, 68, 69, 70 in the pipe bracket face 65. The method further includes the steps of engaging the pipe bracket face 20 of the AEM 15 with the manifold face 55 of the transition plate 50, and aligning and communicating the plurality of ports 57, 58, 59, 60 in the manifold face 55 with the plurality of ports 22, 23, 24, 25 in the pipe bracket face 20 of the AEM 15; engaging the pipe bracket face 30 of the pipe mounting bracket 11 with the pipe bracket face 65 of the transition plate 50, and aligning and communicating the plurality of ports 67, 68, 69, 70 in the pipe bracket face 65 with the plurality of ports 32, 33, 34, 35 in the pipe bracket face 30 of the pipe mounting bracket 11; and establishing a pneumatic interface between the AEM 15 and the pipe mounting bracket 11 via the transition plate 50.

The plurality of ports 57, 58, 59, 60 in the manifold face 55 of the transition plate 50 include an emergency reservoir port 57, an auxiliary reservoir port 58, a brake pipe port 59, and a brake cylinder port 60. The plurality of ports 67, 68, 69, 70 in the pipe bracket face 65 of the transition plate 50 include an accelerated release or control reservoir port 67, an auxiliary reservoir charging port 68, a brake pipe port 69, and a brake cylinder or dummy volume port 70. The emergency reservoir port 57 in the manifold face 55 is in communication with the accelerated release or control reservoir port 67 in the pipe bracket face 65. The auxiliary reservoir port 58 in the manifold face 55 is in communication with the auxiliary reservoir charging port 68 in the pipe bracket face 65. The brake pipe port 59 in the manifold face 55 is in communication with the brake pipe port 69 in the pipe bracket face 65. The brake cylinder port 60 in the manifold face 55 is in communication with the brake cylinder or dummy volume port 70 in the pipe bracket face 65.

The plurality of ports 32, 33, 34, 35 defined in the pipe bracket face 30 of the pipe mounting bracket 11 include an accelerated release or control reservoir port 32, an auxiliary reservoir charging port 33, a brake pipe port 34, and a brake cylinder or dummy volume port 35. The plurality of ports 22, 23, 24, 25 defined in the pipe bracket face 20 of the AEM 15 include an emergency reservoir port 22, an auxiliary reservoir port 23, a brake pipe port 24, and a brake cylinder port 25. The step of establishing a pneumatic interface between the AEM 15 and the pipe mounting bracket 11 includes pneumatically connecting the emergency reservoir port 22 in the pipe bracket face 20 of the AEM 15 with the accelerated release or control reservoir port 32 in the pipe bracket face 30 of the pipe mounting bracket 11 via the emergency reservoir port 57 in the manifold face 55 and the accelerated release or control reservoir port 67 in the pipe bracket face 65, the auxiliary reservoir port 23 in the pipe bracket face 20 of the AEM 15 with the auxiliary reservoir charging port 33 in the pipe bracket face 30 of the pipe mounting bracket 11 via the auxiliary reservoir port 58 in the manifold face 55 and the auxiliary reservoir charging port 68 in the pipe bracket face 65, the brake pipe port 24 in the pipe bracket face 20 of the AEM 15 with the brake pipe port 34 in the pipe bracket face 30 of the pipe mounting bracket 11 via the brake pipe port 59 in the manifold face 55 and the brake pipe port 69 in the pipe bracket face 65, and the brake cylinder port 25 in the pipe bracket face 20 of the AEM 15 with the brake cylinder or dummy volume port 35 in the pipe bracket face 30 of the pipe mounting bracket 11 via the brake cylinder port 60 in the manifold face 55 and the brake cylinder or dummy volume port 70 in the pipe bracket face 65.

It is to be appreciated that in order to control the development and vent of brake cylinder pressure within the ECP S-4200 requirements within the relatively small, i.e., 280 cubic-inch, dummy volume, the AEM control chokes can be changed to a #52 drill for the fill and spool-B chokes and the vent choke can be changed to a #47 drill. It is also to be appreciated that the transition plate 50 may be made from any material known to be suitable to those having ordinary skill in the art, in particular a high-strength, machinable metal material, such as aluminum or stainless steel.

It is also to be appreciated that the manifold may be of some type other than the AEM 15 that is known to be suitable for use in the Triple Valve system by those having ordinary skill in the art. For instance, the electronic manifold may be an overlay manifold that is configured to include the electronic capability as well as a pneumatic Triple Valve capability so as to enable both pneumatic and ECP functionality.

While embodiments of a transition plate for converting a pneumatically-controlled braking system were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A transition plate for connecting an electronic manifold to a pipe mounting bracket of a Triple Valve railway brake system, the transition plate comprising:
a body having a manifold portion that defines a manifold face configured to engage a face of the electronic manifold and a pipe bracket portion that defines a pipe bracket face configured to engage a face of the Triple Valve pipe mounting bracket;
a plurality of ports defined in the manifold face that are configured to align and communicate with ports in the face of the electronic manifold;
a plurality of ports defined in the pipe bracket face that are configured to align and communicate with ports in the face of the Triple Valve pipe mounting bracket; and
a plurality of air passages extending through the body of the transition plate for connecting the plurality of ports defined in the manifold face with the plurality of ports defined in the pipe bracket face,
wherein the transition plate establishes a pneumatic interface between the electronic manifold and the Triple Valve pipe mounting bracket to establish electronically controlled pneumatic functionality in the brake system,
wherein the plurality of ports in the manifold face include an emergency reservoir port, an auxiliary reservoir port, a manifold face brake pipe port, and a brake cylinder port,
wherein the plurality of ports in the pipe bracket face include an accelerated release or control reservoir port, an auxiliary reservoir charging port, a pipe bracket face brake pipe port, and a brake cylinder or dummy volume port, and
wherein the emergency reservoir port in the manifold face is connected to the accelerated release or control reservoir port in the pipe bracket face by one of the plurality of air passages, the auxiliary reservoir port in the manifold face is connected the auxiliary reservoir charging port in the pipe bracket face by one of the plurality of air passages, the manifold face brake pipe port in the manifold face is connected to the pipe bracket face brake pipe port in the pipe bracket face by one of the plurality of air passages, and the brake cylinder port in the manifold face is connected to the brake cylinder or dummy volume port in the pipe bracket face by one of the plurality of air passages.

2. The transition plate according to claim 1, wherein the body further includes a plurality of reliefs defined therein for accepting fasteners for connecting the transition plate to the electronic manifold and to the Triple Valve pipe mounting bracket.

3. The transition plate according to claim 1, wherein the manifold face includes a plurality of mounting holes, which are configured to accept fasteners to connect the manifold portion to the face of the electronic manifold, and the pipe bracket face includes a plurality of mounting holes, which are configured to accept fasteners to connect the pipe bracket portion to the face of the Triple Valve pipe mounting bracket.

4. A railway brake system, which is a Triple Valve brake system, comprising:
a Triple Valve pipe mounting bracket having a face with a plurality of ports defined therein for establishing pneumatic connections within the system;
an electronic manifold having a face with a plurality of ports defined therein for establishing pneumatic connections within the system; and
a transition plate for pneumatically connecting the electronic manifold to the Triple Valve pipe mounting bracket, the transition plate comprising:
a body having a manifold portion that defines a manifold face engaging the face of the electronic manifold and a pipe bracket portion that defines a pipe bracket face engaging the face of the Triple Valve pipe mounting bracket;
a plurality of ports defined in the manifold face that are configured to align and communicate with the ports in the face of the electronic manifold;
a plurality of ports defined in the pipe bracket face that are configured to align and communicate with the ports in the face of the Triple Valve pipe mounting bracket; and
a plurality of air passages extending through the body of the transition plate for connecting the plurality of ports defined in the manifold face with the plurality of ports defined in the pipe bracket face,
wherein the transition plate establishes a pneumatic interface between the electronic manifold and the Triple Valve pipe mounting bracket to establish electronically controlled pneumatic functionality in the Triple Valve brake system.

5. The railway brake system according to claim 4, wherein the body of the transition plate further includes a plurality of reliefs defined therein for accepting fasteners for connecting the transition plate to the electronic manifold and to the Triple Valve pipe mounting bracket.

6. The railway brake system according to claim 4, wherein the plurality of ports in the manifold face of the transition plate include an emergency reservoir port, an auxiliary reservoir port, a manifold face brake pipe port, and a brake cylinder port.

7. The railway brake system according to claim 4, wherein the plurality of ports in the pipe bracket face of the transition plate include an accelerated release or control reservoir port, an auxiliary reservoir charging port, a pipe bracket face brake pipe port, and a brake cylinder or dummy volume port.

8. The railway brake system according to claim 4, wherein
the plurality of ports in the manifold face of the transition plate include an emergency reservoir port, an auxiliary reservoir port, a manifold face brake pipe port, and a brake cylinder port,
the plurality of ports in the pipe bracket face of the transition plate include an accelerated release or control reservoir port, an auxiliary reservoir charging port, a pipe bracket face brake pipe port, and a brake cylinder or dummy volume port, and
the emergency reservoir port in the manifold face is in communication with the accelerated release or control reservoir port in the pipe bracket face, the auxiliary reservoir port in the manifold face is in communication with the auxiliary reservoir charging port in the pipe bracket face, the manifold face brake pipe port in the manifold face is in communication with the pipe bracket face brake pipe port in the pipe bracket face, and the brake cylinder port in the manifold face is in communication with the brake cylinder or dummy volume port in the pipe bracket face.

9. The railway brake system according to claim 8, wherein
the plurality of ports defined in the face of the Triple Valve pipe mounting bracket include a mounting bracket accelerated release or control reservoir port, a mounting bracket auxiliary reservoir charging port, a mounting bracket brake pipe port, and a mounting bracket brake cylinder or dummy volume port,
the plurality of ports defined in the face of the electronic manifold include an electronic manifold emergency reservoir port, an electronic manifold auxiliary reservoir port, an electronic manifold brake pipe port, and an electronic manifold brake cylinder port, and
the transition plate pneumatically connects the electronic manifold emergency reservoir port in the face of the electronic manifold with the mounting bracket accelerated release or control reservoir port in the face of the pipe mounting bracket via the emergency reservoir port in the manifold face and the accelerated release or control reservoir port in the pipe bracket face, the electronic manifold auxiliary reservoir port in the face of the electronic manifold with the mounting bracket auxiliary reservoir charging port in the face of the pipe mounting bracket via the auxiliary reservoir port in the manifold face and the auxiliary reservoir charging port in the pipe bracket face, the electronic manifold brake pipe port in the face of the electronic manifold with the mounting bracket brake pipe port in the face of the pipe mounting bracket via the manifold face brake pipe port in the manifold face and the pipe bracket face brake pipe port in the pipe bracket face, and the electronic manifold brake cylinder port in the face of the electronic manifold with the mounting bracket brake cylinder or dummy volume port in the face of the pipe mounting bracket via the brake cylinder port in the manifold face and the brake cylinder or dummy volume port in the pipe bracket face.

10. The railway brake system according to claim 4, wherein the manifold face of the transition plate includes a plurality of mounting holes, which accept fasteners that connect the manifold portion to the face of the electronic manifold, and the pipe bracket face of the transition plate includes a plurality of mounting holes, which accept fasteners that connect the pipe bracket portion to the face of the Triple Valve pipe mounting bracket.

11. A method of pneumatically connecting an electronic manifold to a pipe mounting bracket of a Triple Valve railway brake system, wherein the electronic manifold includes a face with a plurality of ports defined therein and the Triple Valve pipe mounting bracket includes a face with a plurality of ports defined therein, the method comprising the steps of:
providing a transition plate, the transition plate comprising:
a body having a manifold portion that defines a manifold face and a pipe bracket portion that defines a pipe bracket face;
a plurality of ports defined in the manifold face and a plurality of ports defined in the pipe bracket face; and
a plurality of air passages extending through the body of the transition plate for connecting the plurality of ports defined in the manifold face with the plurality of ports defined in the pipe bracket face;
engaging the face of the electronic manifold with the manifold face of the transition plate, and aligning and communicating the plurality of ports in the manifold face with the plurality of ports in the face of the electronic manifold;
engaging the face of the Triple Valve pipe mounting bracket with the pipe bracket face of the transition plate, and aligning and communicating the plurality of ports in the pipe bracket face with the plurality of ports in the face of the Triple Valve pipe mounting bracket; and
establishing a pneumatic interface between the electronic manifold and the Triple Valve pipe mounting bracket via the transition plate to establish electronically controlled pneumatic functionality in the brake system.

12. The method according to claim 11, wherein
the plurality of ports in the manifold face of the transition plate include an emergency reservoir port, an auxiliary reservoir port, a manifold face brake pipe port, and a brake cylinder port,
the plurality of ports in the pipe bracket face of the transition plate include an accelerated release or control reservoir port, an auxiliary reservoir charging port, a pipe bracket face brake pipe port, and a brake cylinder or dummy volume port, and
the emergency reservoir port in the manifold face is in communication with the accelerated release or control reservoir port in the pipe bracket face, the auxiliary reservoir port in the manifold face is in communication with the auxiliary reservoir charging port in the pipe bracket face, the manifold face brake pipe port in the manifold face is in communication with the pipe bracket face brake pipe port in the pipe bracket face, and the brake cylinder port in the manifold face is in communication with the brake cylinder or dummy volume port in the pipe bracket face.

13. The method according to claim 12, wherein
the plurality of ports defined in the face of the Triple Valve pipe mounting bracket include a mounting bracket accelerated release or control reservoir port, a mounting bracket auxiliary reservoir charging port, a mounting bracket brake pipe port, and a mounting bracket brake cylinder or dummy volume port, the plurality of ports defined in the face of the electronic manifold include an electronic manifold emergency reservoir port, an electronic manifold auxiliary reservoir port, an electronic manifold brake pipe port, and an electronic manifold brake cylinder port, and the transition plate pneumatically connects the electronic manifold emergency reservoir port in the face of the electronic manifold with the mounting bracket accelerated release or control reservoir port in the face of the pipe mounting bracket via the emergency reservoir port in the manifold face and the accelerated release or control reservoir port in the pipe bracket face, the electronic manifold auxiliary reservoir port in the face of the electronic manifold with the mounting bracket auxiliary reservoir charging port in the face of the pipe mounting bracket via the auxiliary reservoir port in the manifold face and the auxiliary reservoir charging port in the pipe bracket face, the electronic manifold brake pipe port in the face of the electronic manifold with the mounting bracket brake pipe port in the face of the pipe mounting bracket via the manifold face brake pipe port in the manifold face and the pipe bracket face brake pipe port in the pipe bracket face, and the electronic manifold brake cylinder port in the face of the electronic manifold with the mounting bracket brake cylinder or dummy volume port in the face of the pipe mounting bracket via the brake cylinder port in the manifold face and the brake cylinder or dummy volume port in the pipe bracket face.

* * * * *